(12) United States Patent
Holmberg

(10) Patent No.: US 6,251,268 B1
(45) Date of Patent: Jun. 26, 2001

(54) FILTERING APPARATUS

(75) Inventor: Glenn Holmberg, Tyringe (SE)

(73) Assignee: Waterlink AB (SE)

( * ) Notice: Subject to any disclaimer, the term of this patent is extended or adjusted under 35 U.S.C. 154(b) by 0 days.

(21) Appl. No.: 09/355,260

(22) PCT Filed: Jan. 23, 1998

(86) PCT No.: PCT/SE98/00096

§ 371 Date: Aug. 30, 1999

§ 102(e) Date: Aug. 30, 1999

(87) PCT Pub. No.: WO98/35743

PCT Pub. Date: Aug. 20, 1998

(30) Foreign Application Priority Data

Jan. 27, 1997 (SE) .................................... 9700235

(51) Int. Cl.$^7$ ................................................. B01D 33/333
(52) U.S. Cl. .................... 210/155; 210/158; 210/329; 210/396
(58) Field of Search .................... 210/155, 158, 210/160, 329, 396, 400, 783, 344, 526

(56) References Cited

U.S. PATENT DOCUMENTS

| 3,620,373 | * | 11/1971 | Crell et al. . | |
|---|---|---|---|---|
| 3,755,846 | * | 9/1973 | Sandler . | |
| 4,597,864 | | 7/1986 | Wiesemann | 210/160 |
| 4,790,934 | * | 12/1988 | Shishkin et al. . | |
| 5,565,093 | | 10/1996 | Frankenberger | 210/158 |

FOREIGN PATENT DOCUMENTS

| 0676227 | 10/1995 | (EP) . |
|---|---|---|
| 8602014 | 4/1986 | (WO) . |
| 9117807 | 11/1991 | (WO) . |

* cited by examiner

Primary Examiner—W. L. Walker
Assistant Examiner—David Sorkin
(74) Attorney, Agent, or Firm—Ladas and Parry

(57) ABSTRACT

The invention relates to a filtering apparatus for removing matter and bodies accompanying a liquid flow. The filtering apparatus includes a number of individual filter elements disposed to be displaced in an endless path. The endless path is formed by one or more arcs in relation to which the filter elements are displaceable. A drive is provided for displacing one filter element at a time past a scraper device for removal of matter accumulated against the filter element.

15 Claims, 6 Drawing Sheets

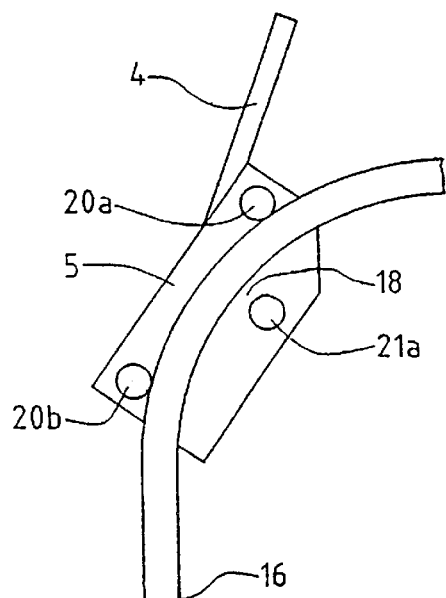
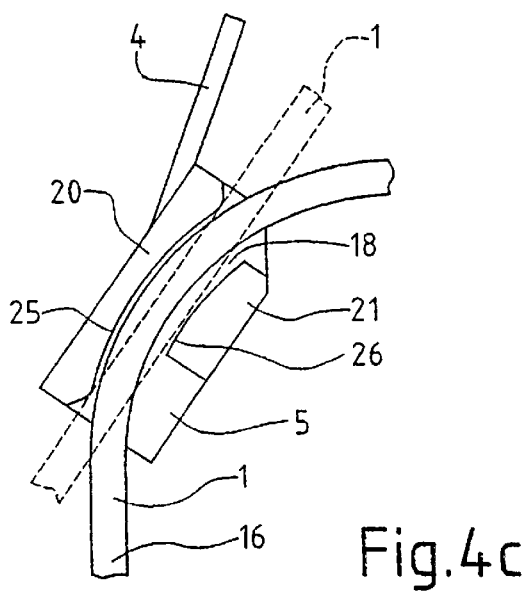
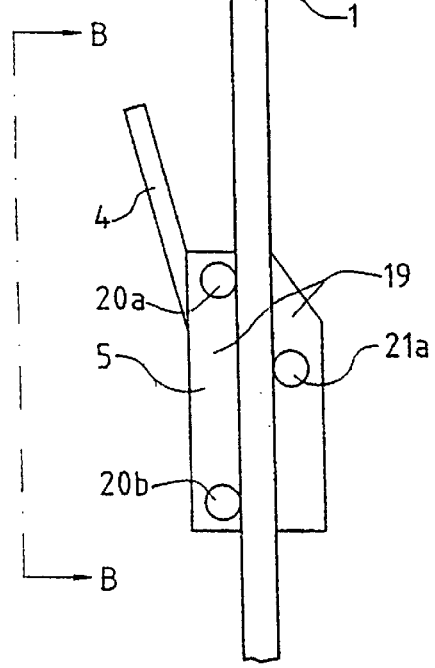
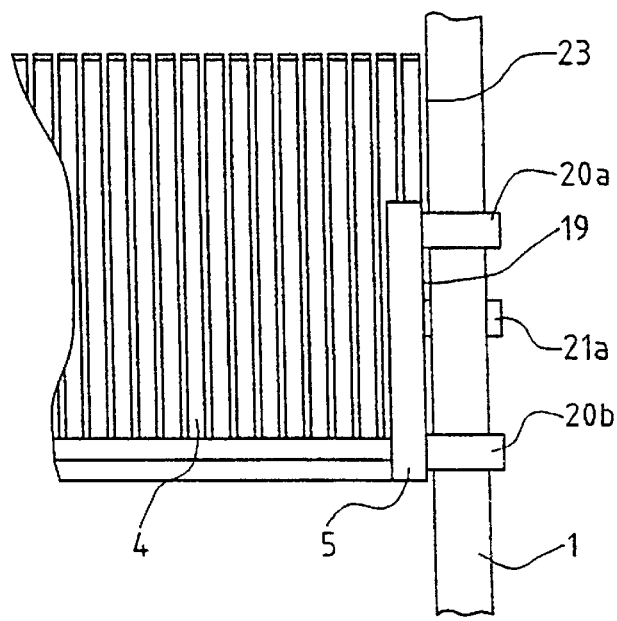
Fig.4c
Fig.4a
Fig.4b

FILTERING APPARATUS

FIELD OF THE INVENTION

The present invention relates to a filtering apparatus for separating solid material from a liquid.

BACKGROUND

In many different contexts, there is a need to be able to separate, from liquid flows, matter or bodies accompanying the liquid. To this end, use is made today of different types of filtering or screening apparatuses which, as a rule, are based on the principle that an endless belt provided with filter elements is immersed in the liquid. There are also embodiments in which the filter elements are fixed on two or more endless chains. Moreover, the filter elements are provided with projecting portions which are disposed to lift up the accumulated matter out of the liquid. The projecting portions are generally formed from separate elements.

One problem in prior art apparatuses of this type is that it is difficult entirely to clean the individual filter elements, since they are positioned so close together that, on cleaning, they block one another to some degree or are blocked by devices for lifting up accumulated matter. If the cleaning operation does not function, residual matter on the filter elements will be carried down into the liquid flow behind the filter or screening arrangement and once again pollute the liquid. This is of course a disadvantage.

Another problem inherent in the prior art apparatuses is that a portion of the matter which is separated from the liquid continuously remains in the filter and/or the drive means. In such cases, the risk is imminent that the filter becomes clogged or that the entire apparatus seizes, which may destroy both the drive means and filter components.

SUMMARY OF THE INVENTION

The above-outlined problems are obviated using an apparatus according to the invention.

The apparatus according to the present invention is disposed to feed the filter elements one by one past a scraping and cleaning device.

Because of the fact that the filter elements are separated from one another when they pass the scraping and cleaning device, there will be obtained an extremely effective scraping of accompanying matter, and consequential cleaning of each individual filter element. As a result, a progressive and continuous cleaning of the filtering portions of the filtering apparatus will be achieved.

The filtering apparatus according to the present invention is constructed from a number of individual, discrete elements, for which reason it is simple, when necessary, to repair and possibly replace damaged parts. The apparatus is moreover easy to completely renovate since it is of simple construction both as regards the individual filter elements and the drive means.

BRIEF DESCRIPTION OF THE DRAWINGS

Embodiments of the present invention will be described below with reference to the accompanying drawings. In the accompanying drawings:

FIGS. 4a–b are views of the retainer members of the apparatus; and

DETAILED DESCRIPTION

Figure 1A:
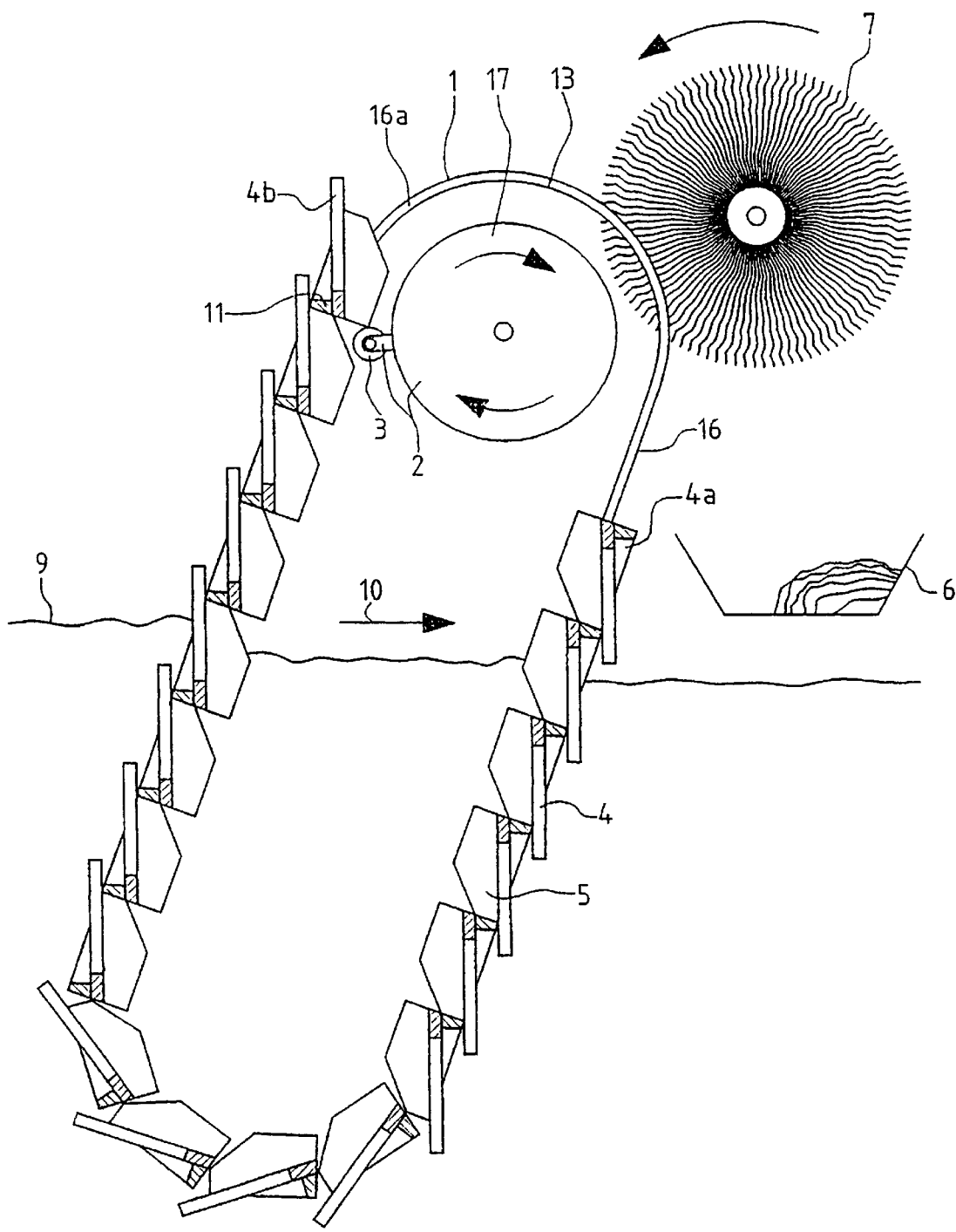
FIGS. 1a–c are side elevations of the apparatus in a first embodiment, with the drive means in different positions.

The filtering apparatus according to the embodiments shown in the drawings includes two endless arcs 1 which form an endless path 16. Each arc has an upper curve 13 and a lower curve. The arcs 1 consist of thin tubes, rods or the like. The arcs 1 support a number of filter elements 4. The filter elements 4 consist, in the embodiments shown in the figures (cf. FIG. 2), of a bracket portion 14 from which projects a number of elongate tongue-like devices 12, hereinafter generally referred to as tongues 12. The tongues preferably consist of plastic material or of metal, for example steel. Depending upon the properties of the bodies or the matter to be separated, a substantially configurationally stable material, a substantially elastically resilient, relatively rigid material, etc., is selected for the tongues 12 of the filter element.

The bracket portion 14 forms a substantially configurationally stable part of the filter element 4 and fixes the tongues 12 at a predetermined distance from one another. Between two adjacent tongues, there will thereby be formed a relatively narrow gap 8, occasionally also designated slot 8 below. The bracket portion 14 is generally disposed along, or forms the one longitudinal edge 22b of the filter element. In such instance, the free ends 15 of the tongues form an opposing edge 22a for the bracket portion. In embodiments in which the bracket portion 14 is disposed between the longitudinal edges of the filter element, e.g. in the region of the longitudinal axis (centre axis) of the filter element, the free ends 15 of the tongues form two opposing edges of the filter element.

The width of the gap 8 is adapted to the relevant field of use of the filtering apparatus. As a rule, the gap is of substantially corresponding width throughout its entire length.

Figure 2:
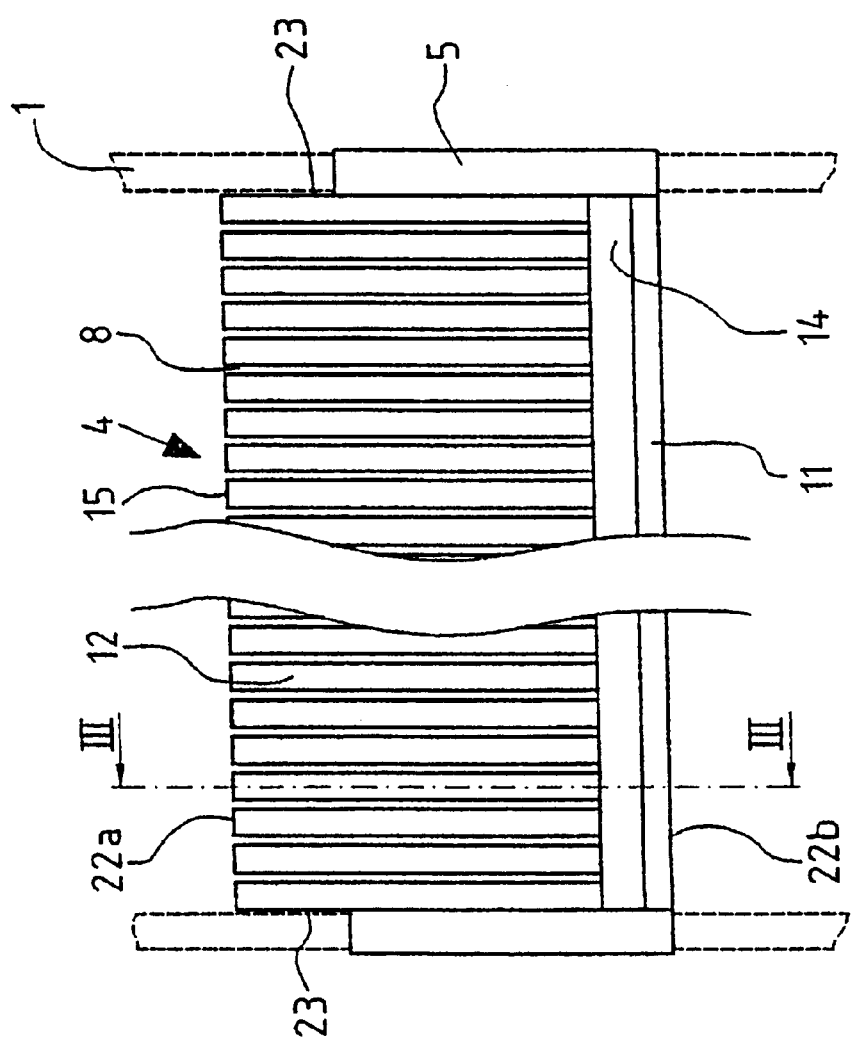
FIG. 2 is a view of a filter element.

In FIG. 2, the filter element 4 is shown in one embodiment in which it includes a substantially rectangular plate provided with a number of slots 8 generally of equal length which run from the one longitudinal side 22a of the plate to positions at a predetermined distance from the other longitudinal side 22b of the plate. In this embodiment of the filter element 4, this is of cam-like appearance.

In one alternative embodiment, the filter element 4 is formed from tongues 12 which are fixed in a groove in the bracket portion 14 in that, on production of the filter element, the tongues 12 have been moved into the groove, whereafter they are fixed in the groove, for example in that the width of the groove is reduced whereby the tongues are clamped in place in the groove. In such instance, the groove is formed between two longitudinal rails which are fixed to one another, with the tongues clamped between the rails.

In other embodiments, the filter element 4 is of slightly different appearance and consists, for example, of a plate provided with holes, a framed net, etc. Embodiments also occur in which the filter element 4 includes gaps disposed in the longitudinal direction of the element.

Figure 3:
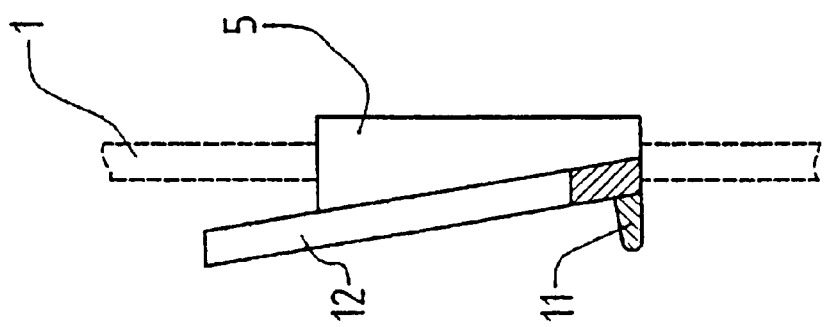
FIG. 3 is a cross-sectional view taken along the line III—III in FIG. 2.

For co-operation with the arcs 1, each filter element is provided with retainer devices 5 (cf. FIG. 3). In one embodiment, the retainer devices 5 comprise an integrated portion of the filter elements 4, while, in other embodiments, they are entirely separate elements. The retainer devices are provided with recesses (grooves) in which the arcs 1 run when the filter elements are displaced along the arcs.

FIGS. 4a–b show one embodiment of the retainer device 5 for the filter element 4. FIG. 4a is a side elevation seen in a direction corresponding to the view the section of FIG. 1a shows. FIG. 4b shows a partial section taken along the line B—B in FIG. 4a.

Retainer devices 5 according to the embodiments shown in FIGS. 4a–c are generally provided in connection with the short sides 23 of the filter element 4 in order to make for the movement guided by the arcs 1. The retainer device 5 includes two retainer elements 19 from which guide elements 20, 20a, 20b, 21, 21a project out. The guide elements are, in FIGS. 4a, b, shown in one embodiment in which at least three guide elements are required. In the figures, the guide elements are shown as heels 20a, 20b, 21a of circular cross-section. Between two of the guide elements 20a, b on the one side and the guide element 21a on the other side, there is formed a path 18, hereinafter generally referred to as a groove 18.

FIG. 4c shows one embodiment of the retainer device 5 where only two guide elements (heels) 20, 21 are required. The heels form between them a curved groove 18 where the outermost (left-hand) heel faces a concave surface 25 towards the arc 1, and the inner (right-hand) heel faces a convex surface 26 towards the arc 1. The groove 18 is formed between the two surfaces. In FIG. 4c, the position of the arc 1 in the groove 18 is shown by broken lines when the filter elements are located on a straight section of the arc. It will be apparent from the figure that the distance between the most proximate portion of the convex surface and the straight line between the portions in which the concave surface 25 begins and terminates amounts at least to the width of the arc 1.

Both in the embodiment with three heels and in the embodiment with two heels, the height of the guide elements and the width of the path are adapted to the dimensions of the endless arcs 1 in order to make it possible for the retainer device 5 to be displaced (guided by the guide elements) along the arc 1 which is placed in the groove 18. The retainer elements 19 hold the filter elements 4 in place on this placement along the endless path 16.

It will be obvious to a person skilled in the art that, in other embodiments, the retainer device 5 is provided, for example, with four guide elements which are placed pairwise in each end region of the retainer device 5. In certain embodiments, the guide elements are rotatably journalled about their centre axes.

Figure 1B:
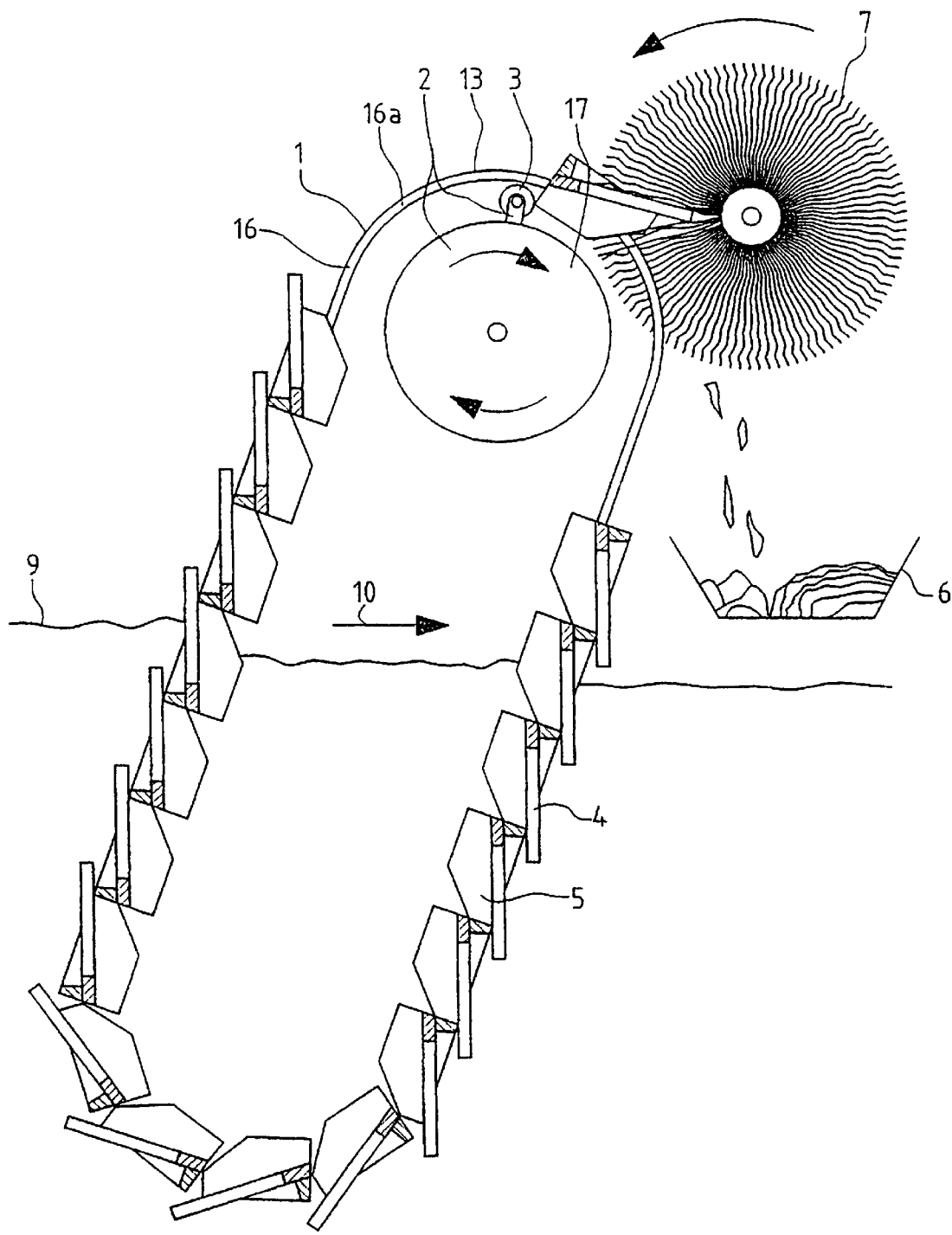
Figure 1C:
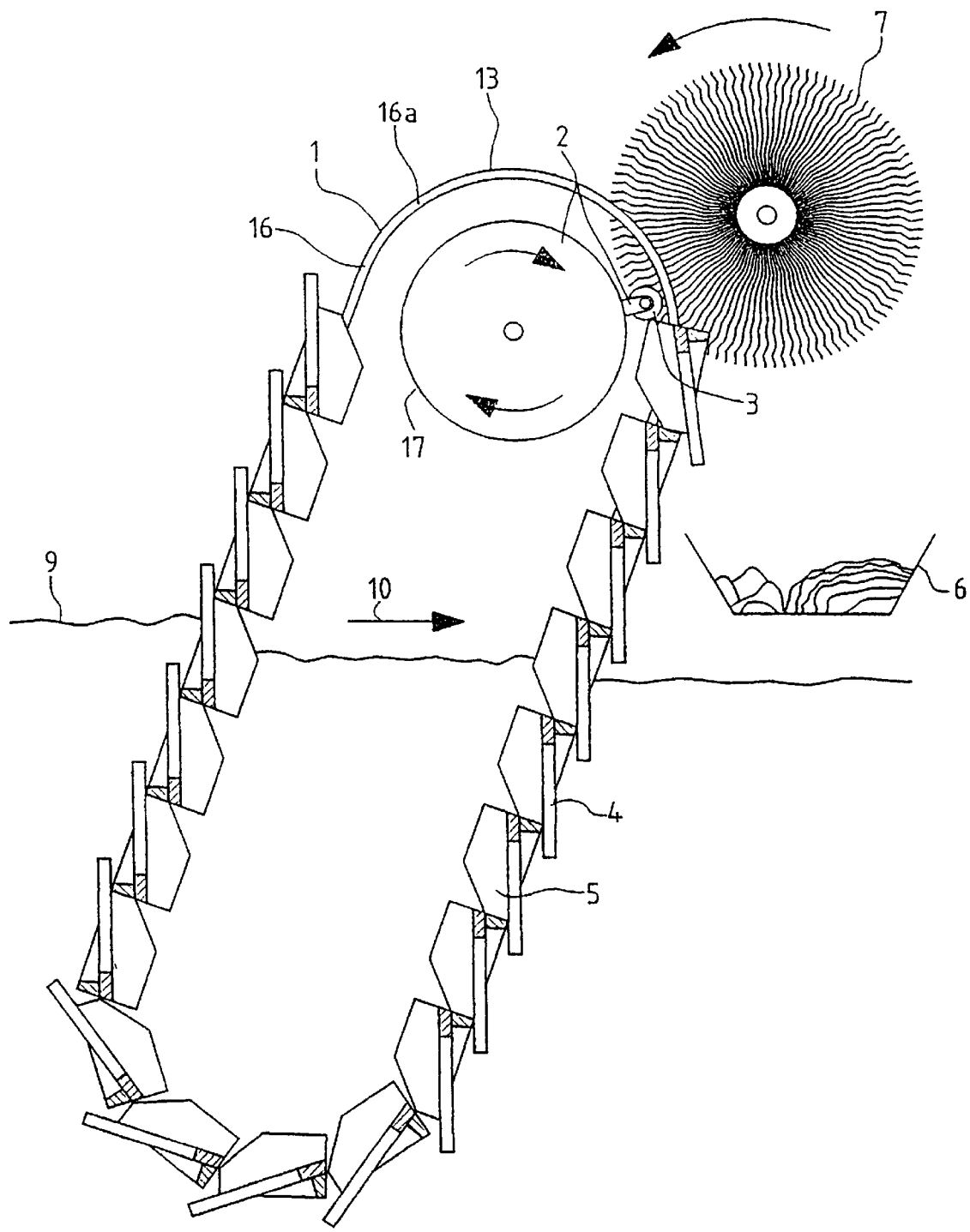

In the embodiments illustrated in FIGS. 4a–c, the retainer devices 5 form separate elements which are interconnected to the filter elements 4. According to the illustrated embodiments, each respective retainer device is oriented such that the retainer device of the filter element has both of its grooves (paths) 18 facing away from one another. In other embodiments, they are turned to face towards one another, as illustrated in FIGS. 1a–c and in FIG. 5. The term "arc" is here taken to signify generally means which guide the movement of the filter elements in the endless path 16 formed by the tubes (rods) and shown in FIGS. 1a–1c and FIG. 5. The length, cross-section and other dimensions such as the diameter of the curves of each arc varies between different embodiments. In one embodiment, the arcs consist of a slit profile, for example a tubular profile, the retainer devices 5 of the filter elements include guide and retainer elements 20, 20a, 20b, 21, 21a which are disposed to be guided by the profile during displacement, for example in the slit of the profile. Assembly and replacement of the filter elements take place, for example, when the arcs are formed from a tubular profile, via a removable rear edge of the filter elements.

At one longitudinal side 22b of the filter elements 4, there is generally provided a bead 11 (cf. FIGS. 2 and 3). The beads of the filter elements form, along the longitudinal edge 22b, which, upstream of the filtering apparatus is turned to face downwards, on the one hand abutments which assist in lifting up the accumulated matter, and, on the other hand, seals against adjacent filter elements in order to prevent matter from passing through one filter element to another.

The apparatus according to the present invention also displays drive means 2 which, in FIGS. 1a–c is shown in one embodiment in which the drive means includes a drive drum 17 provided with a driver device 3, for example a drive element 3 or a drive pin 3 for feeding only one filter element 4 at the time past a scraper device 7. In order to facilitate an understanding of this description, the term drive element or drive pin will be used in the continuation of this description without any restrictive meaning. In the illustrated embodiment, the scraper device consists of a rotary brush 7. In other embodiments, use may be made of scrapers, brushes or the like which are disposed such that, on passage of the filter elements 4, the scraper device is urged against it.

When matter which has been entrapped by the filter elements 4 and lifted up out of the liquid passes the scraper device 7, this removes the matter from the filter element and the matter falls down into a receptacle device 6, for example an accumulator vessel 6 which is disposed downstream of the apparatus. The accumulator vessel 6 consists, in the illustrated embodiment, of a vessel which is emptied or replaced when necessary. In other embodiments, the accumulator device may be a conveyor which displaces the accumulated matter to a suitable collection point.

In the embodiment according to FIGS. 1a–c, driving of the individual filter elements proceeds such that the drive pin 3 of the drive drum 17 enters into engagement with the uppermost filter element 4 on the upstream side (to the left according to FIG. 1a), the drive pin lifting and displacing the filter element to a position where, by the action of the brush 7 or because of its own weight, it falls down against the filter elements 4 located on the downstream side of the curve 13 (FIG. 1b). In such instance, the filter elements are displaced one at a time around the upper curve 13 of the arc 1 and pass one by one the scraper device 7. When the drive pin 3 of the drive drum 17 reaches a filter element which has fallen down against the filter elements located downstream (FIG. 1c), the drive pin 3 presses, on continued rotation of the drum, the filter element downwards, the entire row of filter elements being advanced forwards in their path. This entails that the next filter element is fed up on the upstream side of the filtering apparatus and comes into a position to be caught by the drive pin 3 on its next passage (FIG. 1a). The cycle then continues in this manner with feeding of only one filter element 4 at a time past the scraper device 7.

In other embodiments, the drive drum 17 is provided with a plurality of drive means, two or more filter elements 14 being simultaneously located on the upper curve 13 of the arc 1. However, the filter elements are still separate and discrete from one another and are fed one by one past the scraper 7. In other embodiments, the drive drum 17 is replaced by one or more drive wheels. The expression "drive drum" and "drive element" is employed to facilitate an understanding of the present description, but a person skilled in the art will perceive that, according to the present invention, the combination of drive drum—drive element occurs in many different versions, for example the drive drum 17 may be designed as a rod construction etc., and the drive pin 3 as a cylinder, triangle, bead, heel, point etc.

Figure 5:
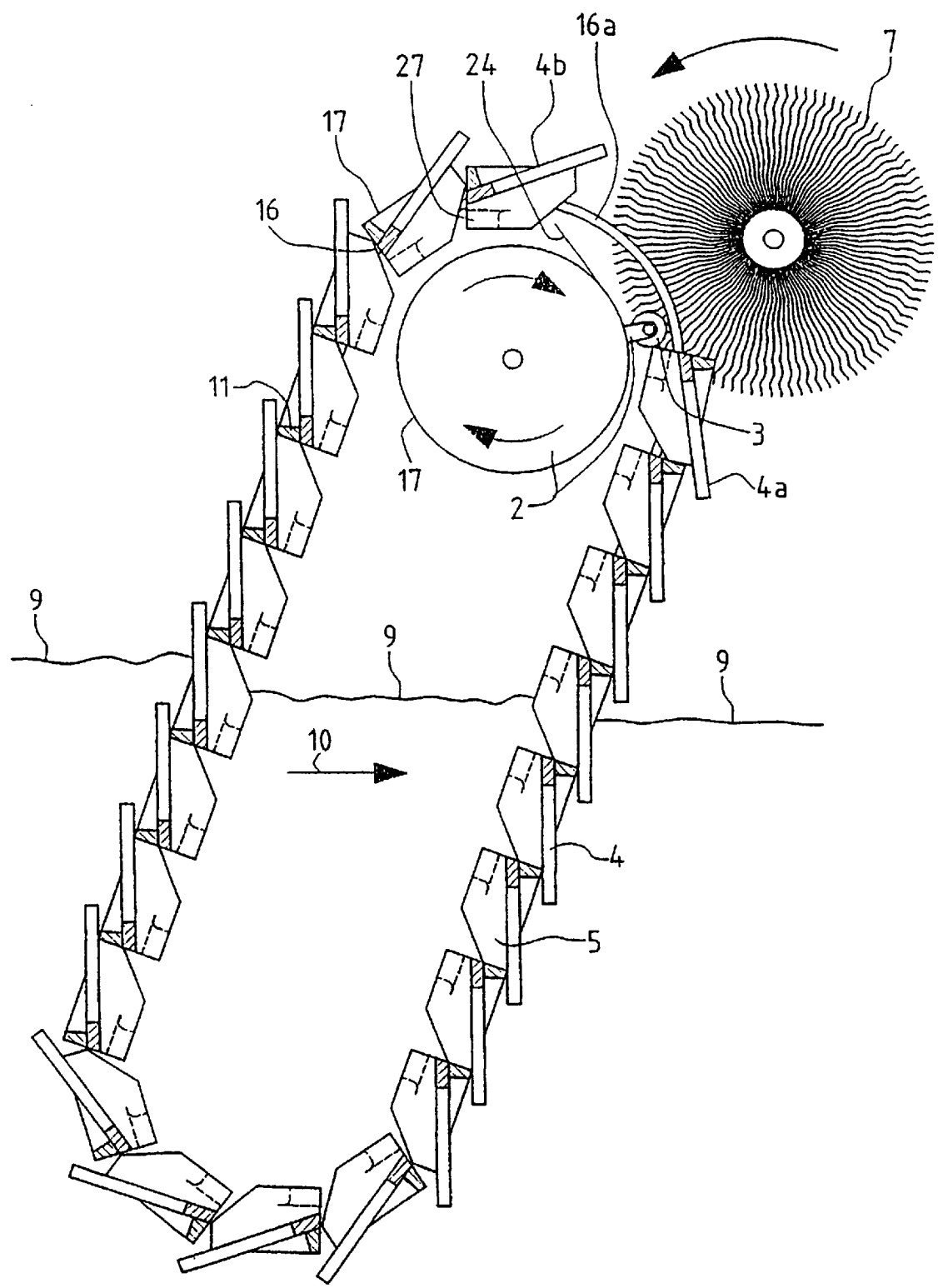
FIG. 5 is a side elevation of the apparatus in a second embodiment.

In the embodiment illustrated in FIG. 5, the drive drum 17 of the apparatus includes an arrest device 24 which, in the direction of rotation of the drive drum 17, is located after the drive pin 3 disposed on the drive drum. The arrest device 24 is shown, in the figure, as a return resilient tongue 24. The filter elements 4 are provided with an abutment 27 for co-operation with the arrest device 24.

The number of filter elements 4 is selected such that, between the uppermost filter element 4a on the downstream side of the apparatus and the filter element 4b located most proximate the brush 7 on the upstream side of the apparatus, there is a distance which is adapted such that when the uppermost filter element 4a on the downstream side departs from the region of the brush 7, the filter element 4b located most proximate the brush on the upstream side of the apparatus is closely adjacent the brush. When the drive pin 3 presses the uppermost filter element 4a on the downstream side downwards and displaces the entire row of filter elements along the path 16, the upstream filter element located most proximal the brush is moved in towards the brush. When the contact of the drive pin 3 with the uppermost filter element 4a ceases, the filter element 4b located upstream and most proximal the brush has already passed the position from which the brush, on its rotation, displaces the filter element along the curve of the arc.

The displacement by the brush 7 of the filter element 4 is decelerated when the abutment 27 of the filter element reaches the arrest device 24 (the tongue) of the drum, whereafter the filter element, under abutment against the arrest device, is displaced at the same rate as the rotation of the drive drum 17. On continued rotation of the drive drum, the arrest device 24 is displaced to a position in which the contact between the abutment 27 and the arrest device 24 ceases. As a rule, the filter element has already reached the uppermost filter element 4a on the downstream side of the apparatus. In certain embodiments, the apparatus is dimensioned in order to allow the filter element to fall under the action of gravity in order to reach the uppermost filter element in the row of filter elements. The continued rotation of the drive drum entails that the drive pin 3 is brought into abutment against the last filter element arriving in the row of filter elements and forces it downwards under renewed displacement of the row of the filter elements. The just-described cycle is thereafter repeated.

When the filtering apparatus according to the illustrated embodiments is put into use, the apparatus is placed in the flowing liquid with the drive means 2 and scraper device 7 above the liquid surface 9. The apparatus slopes with its upper region somewhat forwards in the direction 10 of the liquid flow and in relation to the vertical plane. The active side of the filtering apparatus is turned to face towards the direction of flow 10 of the liquid.

Matter and bodies which accompany the liquid are entrapped by the filter elements 4, while the liquid passes through the slots 8 of the filter elements. When the filter elements have been progressively fed round, the accumulated matter remains on the filter elements by friction between accumulated matter and the filter elements 4 and/or by abutment against the longitudinal edge of the filter elements 4 and is lifted up out of liquid. When the filter elements have passed their highest point and commence a downwardly-directed movement, the accumulated matter falls progessively down into the accumulator device 6. The matter which is removed from the filter elements 4 by the scraper device 7 also falls down into the accumulator device.

It generally applies according to the present invention that the filter elements 4 form a continuous row disposed such that the upper curve 13 of the path includes a path section 16a along which the filter elements are displaced one at the time.

The filter elements are discrete and separate from one another when, one at a time, they pass the path section 16a and the scraper and cleaning device 7 disposed adjacent the path section. Each individual filter element will thereby be accessible for an efficient removal of accompanying matter and for an efficient cleaning of the filter element. As a result, a progressive and continuous cleaning of the filtering portion of the filter elements will thereby be achieved.

In the foregoing description, use has occasionally been made of the expressions right-hand and left-hand. These expressions have no restrictive meaning but have been employed to facilitate an understanding of the description and relate only to those orientations the apparatus and devices included in the apparatus have in the figures.

The description has referred to but a limited number of embodiments. A person skilled in the art will readily perceive that the present invention encompasses a large number of further embodiments within the scope of the appended claims.

What is claimed is:

1. A filtering apparatus for separating solids from a liquid, the apparatus comprising a plurality of individual filter elements (4) disposed to be displaced along an endless path (16) having upstream and downstream portions and upper and lower curved portions joining the upstream and downstream portions, the lower curved portion and part of the upstream and downstream portions being immersed in the liquid from which the solids are to be separated, said endless path (16) including a stationary endless element extending along said path and having an arcuate cross-section, said filter elements (4) being disconnected from one another and being individually slidably displaceable along said endless element, said filter elements having respective guide elements which abut against one another in said upstream and downstream portions and in said lower curved portion, drive means along said endless path for engaging successive filter elements one by one to displace the filter elements individually past a scraper device and then advance all of the other filter elements along said endless path.

2. The filtering apparatus as claimed in claim 1, wherein the scraper device comprises a rotary brush which abuts with pretensioning against the filter elements (4) as they pass the rotary brush.

3. The filtering apparatus as claimed in claim 1, wherein each said the filter elements (4) include a number of tongues (12) between which slits (8) are disposed.

4. The filtering apparatus as claimed in claim 1, wherein the individual filter elements (4) include a bead (11) disposed along an edge (22b) which, in the filter element (4) is turned to face downwards when the filter element is located on said upstream portion, said bead being in abutment against an adjacent filter element (4).

5. The filtering apparatus as claimed in claim 1, wherein the filter elements (4) have retainer devices (5) disposed, in co-operation with said endless (1), to guide travel of the filter elements along the endless path (16).

6. The filtering apparatus as claimed in claim 5, wherein each retainer device (5) includes retainer and guide elements (19, 20, 20a, 20b, 21; 21a) which, on displacement of the retainer device along the endless path (16) run on said endless element (1).

7. The filtering apparatus as claimed in claim 6, wherein each retainer device (5) includes at least two said guide elements (20, 20a, 20b, 21, 21a) which form between them a gap (18) in which said endless element is located for guiding the displacement of the retainer device along the endless path (16).

8. The filtering apparatus as claimed in claim 1, wherein the filter elements (4) form a row of filter elements; and there is formed, in the row of filter elements between an uppermost filter element (4a) on the downstream portion of the path (16), and the filter element (4b) on the upstream portion of the path (16), located most proximal to the scraper device (7), a path section (16a) along which the filter elements are displaced one at a time.

9. Filtering apparatus as claimed in claim 8, wherein the drive means (2) is so disposed, that by downward displacement of the uppermost filter element (4a) on the downstream portion of the path (16) the filter element (4b) located most proximal the scraper device (7) is displaced to a position from which it is displaced past the scraper device (7).

10. The filtering apparatus as claimed in claim 1, wherein the drive means (2); includes a drive device (3) which, by mechanical abutment against only one filter element (4) at a time, controls the displacement of the filter element around the upper curved portion (13).

11. The filtering apparatus as claimed in claim 1, wherein two said endless elements are provided in transverse spaced relation and between which said filter elements are disposed.

12. The filtering apparatus as claimed in claim 1, wherein said endless element comprises a rod or tube.

13. The filtering apparatus as claimed in claim 1, wherein said drive means is located in said upper curved portion of said endless path.

14. The filtering apparatus as claimed in claim 13, wherein said drive means comprises a rotatable drum and a drive pin carried by said drum to advance an uppermost filter element in said upstream portion, individually around said upper curved portion past said scraper device and down against an uppermost filter element in said downstream portion to push all of said filter elements along said endless path.

15. The filtering apparatus as claimed in claim 14, wherein said drive means is outside said liquid.

* * * * *